United States Patent [19]

Katayama et al.

[11] 4,285,534
[45] Aug. 25, 1981

[54] PULSATION-ABSORBING FLEXIBLE PIPE FOR PRESSURE FLUID DEVICE

[75] Inventors: Toshiyuki Katayama, Ako; Kiyokazu Agura; Masayuki Matsuda, both of Himeji, all of Japan

[73] Assignee: Nichirin Rubber Industrial Co., Ltd., Hyogo, Japan

[21] Appl. No.: 107,916

[22] Filed: Dec. 28, 1979

[51] Int. Cl.³ ............................................. F16L 55/00
[52] U.S. Cl. .................................. 285/119; 285/49; 285/256; 138/44
[58] Field of Search .......................... 138/44, 26, 109; 285/49, 256, 119

[56] References Cited

U.S. PATENT DOCUMENTS

| 752,175 | 2/1904 | Monnier | 138/44 |
| 2,330,564 | 9/1943 | Dyer | 138/44 X |

FOREIGN PATENT DOCUMENTS

| 330151 | 12/1920 | Fed. Rep. of Germany | 138/44 |
| 1227879 | 3/1960 | France | 138/44 |
| 51-46763 | 5/1976 | Japan | 138/44 |

Primary Examiner—Dave W. Arola
Attorney, Agent, or Firm—Armstrong, Nikaido, Marmelstein & Kubovcik

[57] ABSTRACT

A pulsation-absorbing flexible pipe being provided with a throttling material at each end of connection metal fittings arranged at both ends of a flexible pipe, and a throttling means, which has a bore of a diameter smaller than that of the flexible pipe, inside of a bore in the flexible pipe, thereby efficiently absorbing pulsation of a pressure fluid discharged from a pressure fluid-feeding device in a pressure fluid device.

2 Claims, 3 Drawing Figures

U.S. Patent          Aug. 25, 1981          4,285,534
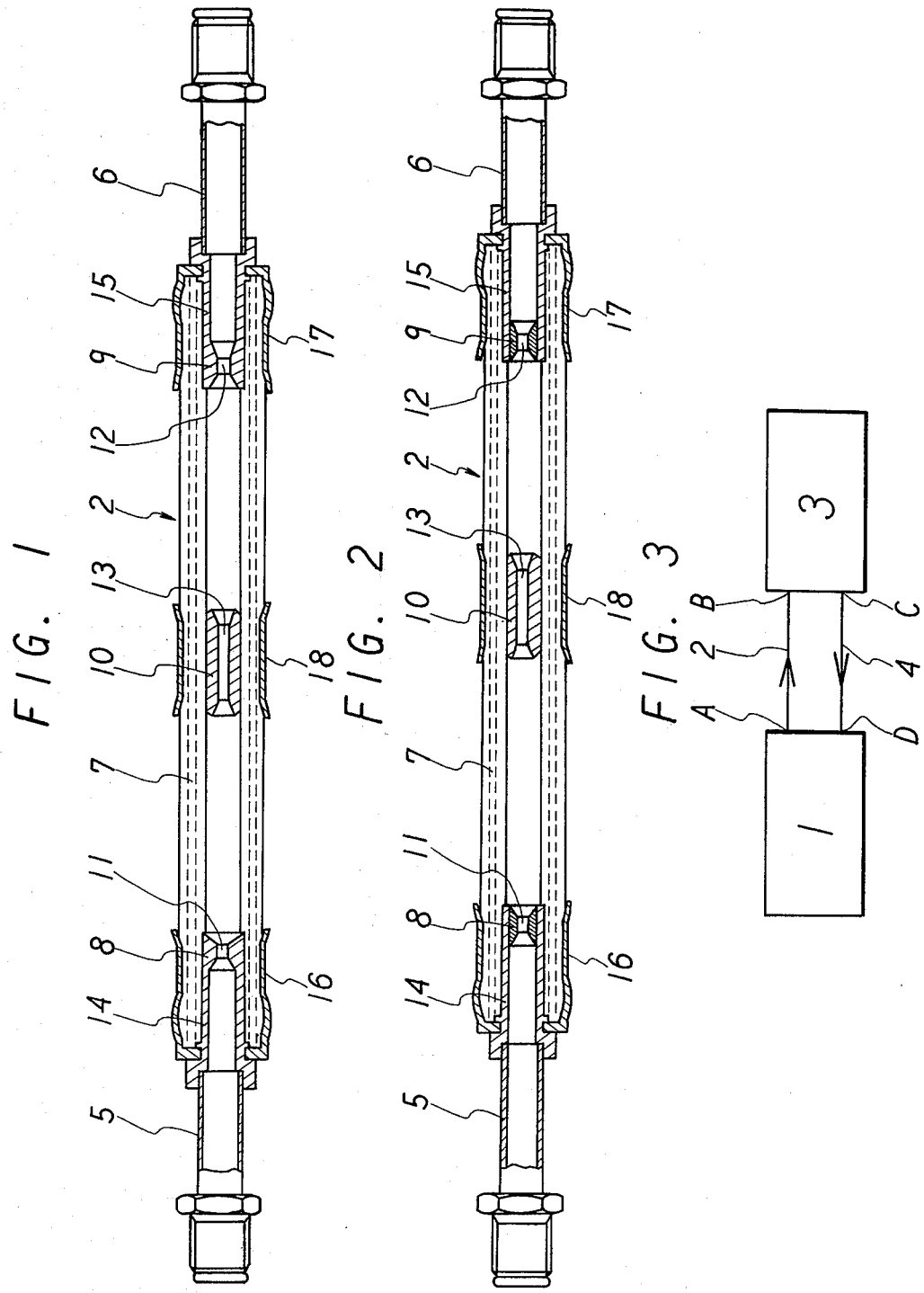

PULSATION-ABSORBING FLEXIBLE PIPE FOR PRESSURE FLUID DEVICE

BACKGROUND OF THE INVENTION

The present invention relates to a novel pulsation-absorbing flexible pipe for a pressure fluid device. More particularly, the present invention relates to a pulsation-absorbing flexible pipe being capable of efficiently absorbing pulsation of a pressure fluid discharged from a pressure fluid-feeding device in a pressure fluid device, thereby completely preventing a noise brought about by the pulsation.

It is well known that there are such drawbacks that, since the pressure fluid discharged from the pressure fluid-feeding device, such as pump or the like, generates pressure pulsation, the working device operative by the pressure fluid and the flexible pipe connecting the pump and the working device oscillate to bring about a noise, and in a serious case operation of the working device becomes unstable.

In order to solve such problems, it has been proposed to provide throttling materials having a bore of a diameter smaller than that of connection metal fittings and acting to narrow the flow of pressure fluid, at each one end of the connection metal fittings arranged at both ends of the flexible pipe which communicates a discharge opening of a pump and a pressure fluid-feed opening of a working device operative by the pressure fluid. Even by the constitution provided with throttling materials at each one end of the connection metal fittings arranged at both ends of the flexible pipe, however, decrease in the pulsation is insufficient, and therefore the problems still remain unsolved.

OBJECT OF THE INVENTION

A main object of the present invention is to provide a pulsation-absorbing flexible pipe which efficiently absorbs pulsation of the pressure fluid discharged from a pressure fluid-feeding device, thereby completely preventing a noise brought about by the pulsation.

Other objects of the present invention will be apparent from the following description with reference to the drawings.

BRIEF DESCRIPTION OF DRAWINGS

FIG. 1 is a schematic sectional view showing one embodiment of a pulsation-absorbing flexible pipe for a pressure fluid device in accordance with the present invention, FIG. 2 is a schematic sectional view showing another embodiment of the pulsation-absorbing flexible pipe for a pressure fluid device in accordance with the present invention, and FIG. 3 is a block diagram of the pressure fluid device.

DETAILED EXPLANATION OF THE INVENTION

The present invention relates to a flexible pipe capable of completely preventing a noise brought about by pulsation by efficiently absorbing the pulsation of the pressure fluid discharged from the pressure fluid-feeding device, the efficient absorption of pulsation being performed by providing a throttling means having a bore of a diameter smaller than that of the flexible pipe at the inside of a bore of the flexible pipe, in addition to the constitution provided with throttling materials at each one end of connection metal fittings arranged at both ends of the flexible pipe as mentioned above.

The flexible pipe in accordance with the present invention is explained below in more detail with reference to the drawings.

FIG. 3 shows a pressure fluid device including, for example, a steering apparatus for automobiles, an air conditioning apparatus for automobiles, a pressure oil apparatus for various applications, a pressure air apparatus for various applications or the like. In this Figure, 1 is a pressure fluid-feeding device, and the pressure fluid discharged from a discharge opening A of the pressure fluid-feeding device 1 is fed through a pulsation-absorbing flexible pipe 2 to a feed opening B of a working device 3 which is operative by the pressure fluid. 4 is a discharge pipe to feed a discharge fluid of the working device 3 from a discharge opening C to an admission opening D of the pressure fluid-feeding device 1. At the discharge opening A of the pressure fluid-feeding device 1 in such a pressure fluid device, the compressed fluid is pulsating.

FIGS. 1 and 2 show one and another embodiments of the aforesaid pulsation-absorbing flexible pipe 2. 5 is a first connection metal fitting, one end of which connects to the discharge opening A of the pressure fluid-feeding device 1 (for example, pump or the like), and the other end of which connects to one end of a flexible pipe 7, the flexible pipe being formed by a material having flexibility and a high coefficient of expansion-contraction of the bore (for example, wire blade hose or nylon blade hose). 6 is a second connection metal fitting, one end of which connects to the pressure fluid-feed opening B of the working device 3, and the other end of which connects to the other end of the flexible pipe 7. Each of 8 and 9 is a throttling material having each bore 11 and 12 of a diameter smaller than that of each first connection metal fitting 5 and the second connection metal fitting 6, respectively, and each of the first throttling material 8 and the second throttling material 9 is arranged at the other end of the inside of the bore of each first connection fitting 5 and the second connection fitting 6, respectively, (each end of nipple 14 and nipple 15). 10 is a throttling means including orifice and nozzle. The throttling means 10 has a bore 13 of a diameter smaller than that of the flexible pipe 7 and is arranged at the inside of the bore of the flexible pipe 7. Each nipple 14 and 15 arranged at the other end of each connection metal fitting 5 and 6, and both ends of the flexible pipe 7 are pinch-fixed together with each first throttling material 8 and second throttling material 9 by means of each socket 16 and 17, respectively. In the embodiment shown in FIG. 1, each of the first throttling material 8 and the second throttling material 9 is formed in a body at each one end of the nipples 14 and 15, respectively, and therefore there is an advantage to minimize the number of parts. The diameter of the bore 13 of the throttling means 10 is, preferably, approximately equal to that of each bore 11 and 12 of the throttling materials 8 and 9, and the means 10 is pinch-fixed by means of an orifice socket 18.

The present invention is described and explained by means of the following example, wherein the pulsation-absorbing flexible pipe for the pressure fluid device in accordance with the invention is used, together with comparative examples.

EXAMPLE

Using a power steering apparatus for automobiles, the rotor of a pump was driven at optional revolution numbers (expressed in terms of r.p.m.) by means of a driving source such as engine, and at that time, each pulsation value $\Delta P$ (which was caused by the rotation of rotor) was measured at the discharge opening A of the pump 1 and the feed opening B of the power steering apparatus for automobiles 3. Kinds of hoses communicating the discharge opening A with the feed opening B, and kinds of throttling means are shown in Table 1.

In the parenthesis in Table 1, the pulsation rate R, which is a ratio of the pulsation value $\Delta P$ to relief pressure P of the pump (the relief pressure of the pump used in this test apparatus was 40 kg./cm.$^2$), and calculated by the equation, $R = \Delta P/P$, is given.

TABLE 1

| | | Pulsation value (kg./cm.$^2$) Measurement position | | | | |
|---|---|---|---|---|---|---|
| Kind of flexible pipe | Revolution number (r.p.m.) | A | $B_1$ | $B_2$ Throttling materials arranged at each one end of both connection metal fittings | $B_3$ Throttling means arranged in the flexible pipe (almost at the center) | $B_4$ Throttling materials of $B_2$ plus throttling means of $B_3$ |
| | 630 | 2.0 | 1.4 | 0.8 | 0.6 | 0.3 |
| | | (5.0) | (3.5) | (2.0) | (1.5) | (0.8) |
| Wire | 1000 | 3.1 | 1.6 | 1.0 | 0.8 | 0.4 |
| blade | | (7.8) | (4.0) | (2.5) | (2.0) | (1.0) |
| hose | 2100 | 5.6 | 1.7 | 1.3 | 1.1 | 0.6 |
| | | (14.0) | (4.3) | (3.3) | (2.8) | (1.5) |
| | 3100 | 5.9 | 2.2 | 1.4 | 1.2 | 0.6 |
| | | (14.8) | (5.5) | (3.5) | (3.0) | (1.5) |
| | 630 | 2.0 | 0.8 | 0.6 | 0.5 | 0.2 |
| | | (5.0) | (2.0) | (1.5) | (1.3) | (0.5) |
| Nylon | 1000 | 3.1 | 1.0 | 0.7 | 0.6 | 0.3 |
| blade | | (7.8) | (2.5) | (1.8) | (1.5) | (0.8) |
| hose | 2100 | 5.6 | 1.5 | 1.2 | 0.9 | 0.5 |
| | | (14.0) | (3.8) | (0.3) | (2.3) | (1.3) |
| | 3100 | 5.9 | 1.0 | 1.2 | 0.9 | 0.5 |
| | | (14.8) | (2.5) | (3.0) | (2.3) | (1.3) |

In carrying out the tests, the hoses as shown in Table 1 were set up to a power steering apparatus for automobiles. Pressures at the aforesaid discharge opening A and feed opening B after passing through the hose were recorded on an electromagnetic oscillograph, and the pulsation value $\Delta P$ and R were calculated by the aforesaid equation. The measurement positions of the feed opening B were expressed in Table 1 in terms $B_1$, $B_2$, $B_3$ and $B_4$ depending upon the combination of the throttling means.

(1) Comparison of the data at the measurement position A and the measurement position $B_1$ demonstrates that the flexible pipe formed by a material having a flexibility (for example, nylon blade hose) exhibits the effect of absorbing pulsation, and particularly the flexible pipe formed by a material having a high expansion coefficient of the bore under increased pressure (nylon blade hose) exhibits a superior wave absorption effect (effect of absorbing pulsation).

(2) Comparison of the data at the measurement position $B_1$ and the measurement position $B_2$ demonstrates that the flexible pipe provided with the throttling materials at each one end of the connection fittings tends to decrease the pulsation value and the pulsation rate, as compared with the flexible pipe having no throttling means, but the decrease of the pulsation is considerably insufficient.

(3) Comparison of the data at the measurement position $B_1$ and the measurement position $B_3$ demonstrates that the flexible pipe having the throttling means arranged almost at the center thereof is superior in the wave absorption effect to the flexible pipe having the throttling materials arranged at each one end of the connection metal fittings.

(4) Comparison of the data at the measurement position A and the measurement position $B_4$ demonstrates that the pulsation generated at the discharge opening of the pump is decreased to about one tenth time by the use of the pulsation-absorbing flexible pipe of the present invention. In other words, it exhibits a muffling effect of about 20 dB (decibel), if a noise is brought about by said pulsation.

(5) Comparison of the data at the measurement position $B_2$ and the measurement position $B_4$ demonstrates that the degree of pulsation in case of using the pulsation-absorbing flexible pipe of the present invention is decreased to 33 to 46% of that in case of using the flexible pipe having the throttling materials arranged at each one end of the connection metal fittings. These data show a significant effect of the flexible pipe provided with the throttling means. The reason why such significant effect can be exhibited is that the diameter of bores of the connection metal fittings 5 and 6 including the nipples 14 and 15 is so small that the ratio F/E of the open area F of the bores 11 and 12 of the throttling materials 8 and 9 to the sectional open area E of the aforesaid bore cannot be made to 4/25 or less, whereas the ratio H/G of the open area H of the bore 13 of the throttling means 10 to the sectional open area G of the bore of the flexible pipe 7 can be easily made to 4/32 or less, and the ratio in respect of the throttling can be decreased to decrease the compression rate as well as increase the wave absorption effect of the flexible pipe.

As described above, the pulsation-absorbing flexible pipe for the pressure fluid device of the present invention exhibits the wave absorption effect, since the throttling means having the bore of a small diameter is provided within the flexible pipe having the bore of a diameter larger than that of the connection metal fittings so as to decrease the compression rate. The wave absorption effect can be further enhanced by the action of expansion-contraction inherent to the material of the flexible pipe. In addition, the remarkable effects such that the pulsation generated in the pressure fluid-feeding device can be decreased to about one tenth time, the noise brought about by the pulsation was decreased by at least about 20 dB, can be obtained by co-operative effects with the wave absorption effect of the throttling materials arranged at each one end of the connection metal fittings.

What we claimed is:

1. A pulsation-absorbing flexible pipe for a pressure fluid device, comprising a first connection metal fitting, having one end for connection to a discharge opening of a pressure fluid-feeding device, a second connection metal fitting, having one end for connection to a feed opening of a working device operated by the pressure fluid discharged from said pressure fluid-feeding device; a flexible pipe coupled to the other ends of said first connection metal fitting and said second connection metal fitting; first throttling means positioned at the other ends of said first connection metal fitting and said second connection metal fitting, said first throttling means having a bore of a diameter smaller than that of the connection metal fittings; and a second throttling means positioned inside of the bore of said flexible pipe, said second throttling means having a bore of a diameter smaller than that of the flexible pipe wherein said second throttling means prevents noise resulting from pulsating of fluid in said flexible pipe.

2. The flexible pipe of claim 1, wherein the diameter of the bore of said second throttling means is approximately equal to that of the bore of said first throttling means.

* * * * *